United States Patent [19]

Gupta et al.

[11] Patent Number: 4,636,337

[45] Date of Patent: Jan. 13, 1987

[54] APPARATUS FOR RAPID CARBONATION

[75] Inventor: Ashis S. Gupta, Marietta; J. Tony Camp, Loganville, both of Ga.

[73] Assignee: The Coca-Cola Company, Atlanta, Ga.

[21] Appl. No.: 504,633

[22] Filed: Jun. 15, 1983

[51] Int. Cl.⁴ ............................................. B01F 3/04
[52] U.S. Cl. ................................... 261/64.3; 99/323.1; 261/122; 261/DIG. 7; 426/477
[58] Field of Search ............... 261/64 B, 65, 121 R, 261/122, DIG. 7; 99/323.1; 215/248, 307, 310; 426/474, 477; 206/0.5; 141/58, 14, 17, 113, 311 R; 137/513.3

[56] References Cited

U.S. PATENT DOCUMENTS

| | | | |
|---|---|---|---|
| 565,922 | 8/1896 | Prax | 99/323.1 |
| 994,260 | 6/1911 | Kennedy | 141/14 |
| 2,051,933 | 8/1936 | Andvig | 261/DIG. 7 |
| 2,314,984 | 8/1940 | Hudson | 261/19 |
| 2,339,640 | 8/1940 | Holinger | 261/115 |
| 2,539,395 | 6/1946 | Banks | 252/93 |
| 2,591,990 | 4/1952 | Wisdom | 261/121 |
| 2,600,901 | 6/1952 | Meldau | 261/121 |
| 2,705,578 | 2/1952 | Burns | 222/80.5 |
| 2,805,846 | 9/1957 | Dewan | 261/DIG. 7 |
| 2,851,360 | 9/1958 | Diller | 99/78 |
| 3,113,674 | 12/1963 | Kiefer et al. | 206/84 |
| 3,240,395 | 3/1966 | Carver | 222/129.1 |
| 3,307,595 | 3/1966 | Berning et al. | 141/4 |
| 3,476,520 | 11/1969 | Hovey | 23/282 |
| 3,480,403 | 11/1969 | Hovey | 426/477 X |
| 3,492,671 | 1/1970 | Hovey | 426/477 X |
| 3,520,416 | 7/1970 | Keedwell | 261/122 X |
| 3,534,788 | 10/1970 | Vergobbi et al. | 141/392 |
| 3,542,524 | 11/1970 | Kimble et al. | 261/122 X |
| 3,572,550 | 3/1971 | Colomina et al. | 261/DIG. 7 |
| 3,752,452 | 8/1973 | Iannelli | 261/DIG. 7 |
| 3,888,998 | 6/1975 | Sampson et al. | 426/67 |
| 3,953,550 | 4/1976 | Gilbey | 261/64 R |
| 3,960,164 | 6/1976 | Kelley | 137/202 |
| 3,985,267 | 10/1976 | Selvia | 222/70 |
| 3,986,535 | 10/1976 | Meckstroth | 141/113 |
| 4,025,655 | 5/1977 | Whyte et al. | 426/66 |
| 4,028,441 | 6/1977 | Richards | 261/36 R |
| 4,040,342 | 8/1977 | Austin et al. | 99/323.1 |
| 4,110,255 | 8/1978 | Liepa et al. | 252/445 Z |
| 4,147,808 | 4/1979 | Liepa et al. | 426/477 |
| 4,148,334 | 4/1979 | Richards | 137/389 |
| 4,186,215 | 1/1980 | Buchel | 426/86 |
| 4,188,304 | 2/1980 | Clarke et al. | 206/0.5 X |
| 4,234,442 | 11/1980 | Cornelissens | 252/90 |
| 4,251,473 | 2/1981 | Gilbey | 261/51 |
| 4,304,736 | 12/1981 | McMillin et al. | 261/DIG. 7 |
| 4,316,409 | 2/1982 | Adams et al. | 99/275 |
| 4,323,090 | 4/1982 | Magi | 261/DIG. 7 |
| 4,347,783 | 9/1982 | Ogden | 99/323.1 |
| 4,458,584 | 7/1984 | Annese et al. | 99/323.1 |
| 4,481,986 | 11/1984 | Meyers | 261/DIG. 7 |
| 4,482,509 | 11/1984 | Iannelli | 261/64 B |
| 4,518,541 | 5/1985 | Harris | 261/27 |
| 4,526,730 | 7/1985 | Cochran | 261/121 R |
| 4,548,828 | 10/1985 | Meyers | 426/427 |

FOREIGN PATENT DOCUMENTS

| | | | |
|---|---|---|---|
| 3011106 | 11/1980 | Fed. Rep. of Germany | 426/477 |
| 824853 | 2/1938 | France | 261/DIG. 7 |
| 52210 | 2/1933 | Norway | |
| 1468469 | 3/1977 | United Kingdom | 261/DIG. 7 |
| 2093359 | 9/1982 | United Kingdom | 261/DIG. 7 |
| 2093714 | 9/1982 | United Kingdom | 261/DIG. 7 |

OTHER PUBLICATIONS

Sodastream Product Information, Sodastream, Ltd.
Kenwood Cascade Product Information, Kenwood Cascade (Thorn Cascase Company Limited).

Primary Examiner—Richard L. Chiesa
Attorney, Agent, or Firm—William C. Lee, III; Eduardo M. Carreras

[57] ABSTRACT

An apparatus for rapidly carbonating beverages in less than seven minutes is disclosed, including a container for the beverage to be carbonated and a source of carbon dioxide to be introduced into the beverage through a conduit member. The container is sealed, and a bleed line is coupled for the headspace of the container for continuously venting the headspace to the atmosphere while carbon dioxide is flowing through the beverage to maintain a predetermined pressure in the headspace. The flow of carbon dioxide is maintained by a continuous pressure differential between the conduit member and the headspace. An effective amount of carbonation can be achieved in a relatively short amount of time. A source of carbon dioxide is disclosed which includes a reaction vessel and a chemical package containing a mixture of chemicals that can react in water to give carbon dioxide. The chemical package disclosed provides a time delay of at least ten seconds from the time it is immersed in water to the time the chemical reaction begins.

20 Claims, 9 Drawing Figures

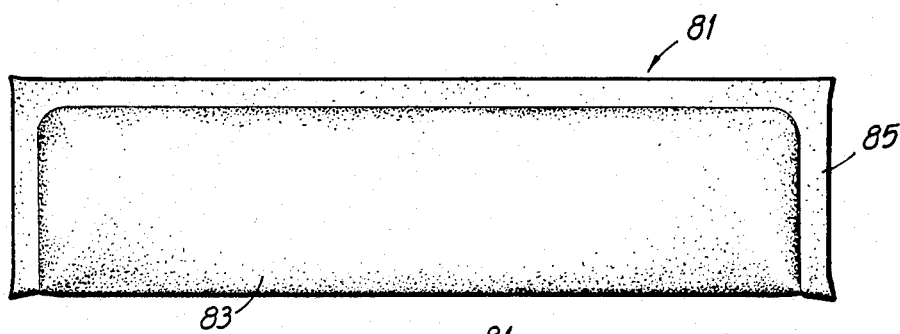
FIG 5
FIG 6
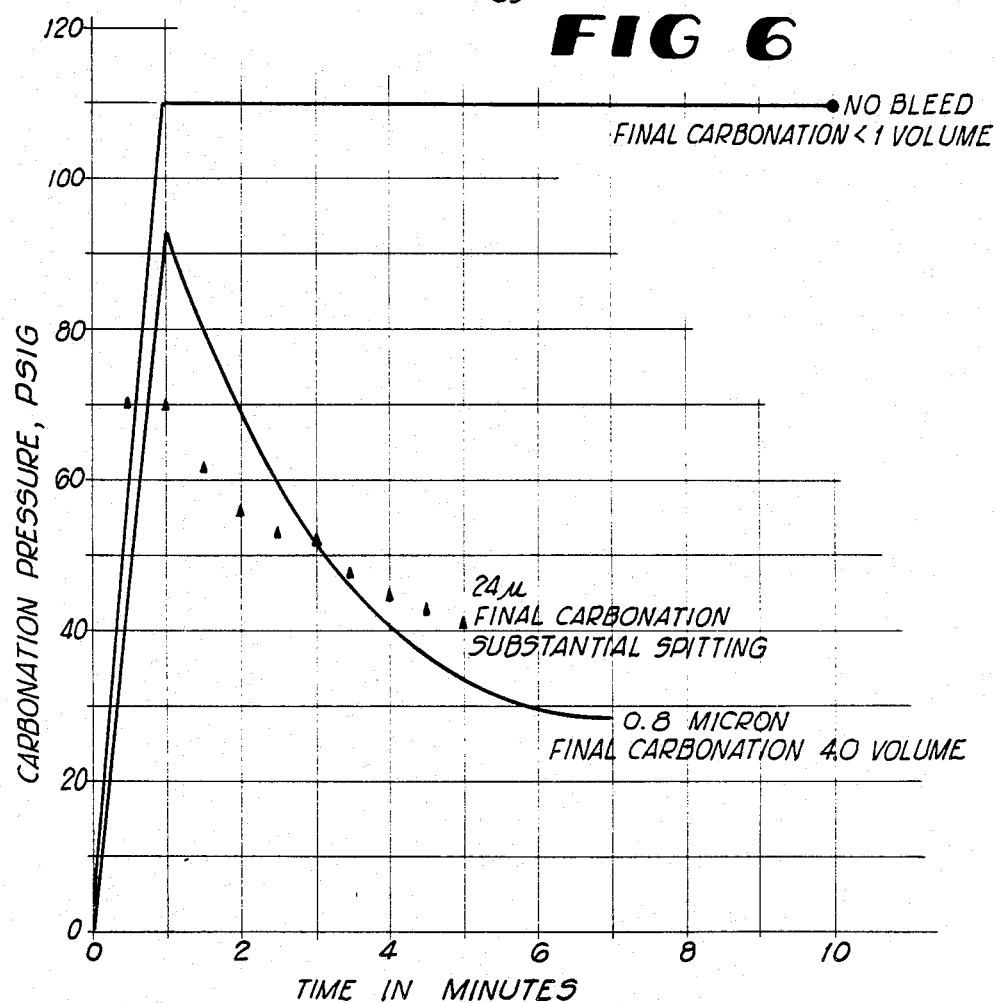
FIG 7

APPARATUS FOR RAPID CARBONATION

BACKGROUND OF THE INVENTION

1. Field of Invention

The present invention relates to devices for carbonating beverages, more particularly to a portable rapid carbonator for carbonating a predetermined quantity of premixed beverage

2. Description of the Prior Art

The volume of carbon dioxide in a finished beverage is an important factor in its acceptability by the consumer, because the quantity of carbon dioxide dissolved in the beverage is what gives the beverage its sparkle, and governs the length of time, along with such other factors as temperature, that the beverage will continue to effervesce. Some beverages taste better with high carbonation, for example, ginger ales. Others taste better with low carbonation, for instance orange flavors. Most drinks, however, will have carbonation of between 3½ to 4.0 volumes of carbon dioxide, particularly cola drinks.

Henry's law states that the amount of the gas dissolved in a given volume of a solvent at constant temperature is directly proportional to the pressure of the gas with which it is in equilibrium. According to this law, the amount of carbon dioxide dissolved by water at a given temperature is proportional to the pressure of the carbon dioxide on the water. This law is, however, conditioned by the nature of the molecule as it exists in the gaseous state and as it exists in solution. In the instance of carbon dioxide, as far as carbonated drinks are concerned, variations from Henry's law are not large.

At atmospheric pressure, the amount of carbon dioxide dissolved by water will depend solely on the temperature. This solubility is greater at lower temperatures than at higher temperatures. The unit of measurement that has been adopted by the beverage and bottling industry as standard is the volume. The volume is defined as the amount of gas in milliliters that a given volume of water will absorb at atmospheric pressure, (760 mm. of mercury) and 60° F. (15.5°C.). These are arbitrary points set by convention. This condition registers as zero on the scale of gauges commonly used to measure the volumes of carbon dioxide absorbed in carbonated beverages. Thus at 60° F. and 1 atmosphere beverage water will absorb 1 volume of carbon dioxide, represented as zero on carbon dioxide gauges. When the pressure is increased to approximately 15 p.s.i. (one additional atmosphere) the water will absorb two volumes of the gas and for each additional 15 p.s.i. or atmospheres of pressure, an additional volume of carbon dioxide will be absorbed. Reduction of the temperature will, as mentioned, permit the water to dissolve greater amounts of carbon dioxide. When the temperature is reduced to 32° F. (0°C.), 1.7 volumes of carbon dioxide will be absorbed and for each additional increase of 15 psi of pressure, there will be an additional absorption of 1.7 volumes.

Carbonators used in the carbonated beverage industry are devices by means of which a large surface of water can be exposed to carbon dioxide gas under pressure. The combination of large surface and pressure enables water to absorb the gas quickly. Commercial carbonators vary in capacity from 250 to 3,600 gallons per hour.

One of the types of carbonators used in the industry is known as the "CEN Saturator." In this device, carbon dioxide gas enters through a gas connection and permeates the tank at operating pressure. Cold water from a water refrigerator is pumped into the tank through a water inlet, forced up a hollow center pipe column, and is then ejected through a specially designed nozzle as a smooth flowing sheet of water. The water is spread outward from the nozzle so that it flows over the underside of an inverted film plate. The water flows smoothly downward towards the center column over the film plate immediately below. This action is repeated continuously, the water at all times flowing as a thin film from plate section to plate section until it runs off the skirt of the lowest film plate into the carbonated water storage area at the bottom of the carbonator tank.

Another type of carbonator cools and carbonates at the same time. In this type of equipment, warm, uncarbonated water enters at the top going into a distribution pan from which it flows downward over stainless-steel cooling plates becoming carbonated with a carbon dioxide being admitted from the side. The cooled, carbonated water flows to a reservoir from which it can be conducted to the filler, at about 34° F.

In more recent years, there has been an expansion of carbonated beverage dispensing from fountain dispensers. In an open-cup dispense, the final drink is made by the dispenser itself. A machine is actuated which consecutively drops a cup or container into position below an outlet port, pumps prepared syrup and carbonated water to a mixing chamber where the drink is mixed, and then releases the mixed drink to the container. In such dispensing equipment, water is carbonated as needed.

Numerous devices have been described for the carbonation of water in non-portable arrangements. For example, U.S. Pat. No. 2,339,640 (Holinger); U.S. Pat. 2,314,984 (Hudson); U.S. Pat. No. 3,240,395 (Carver); U.S. Pat. No 3,752,452 (Iannelli); U.S. Pat. No. 3,960,164 (Kelley); U.S. Pat. No. 4,028,441 (Richards); U.S. Pat. No. 4,148,334 (Richards); and U.S. Pat. No. 4,304,736 (McMillin). The McMillin reference is directed to a method and apparatus for making and dispensing carbonated beverage utilizing propellant carbon dioxide gas for carbonating. The patent discloses a carbonator comprising a pressure vessel having a reservoir for carbonated water, and a gas base above the reservoir. Carbon dioxide gas and water are sprayed into the head space through a nozzle. The high pressure source of carbon dioxide is connected through a conduit to a gas outlet fluidly connected into the carbonator gas base, and is provided with a storage pressure regulator for regulating a predetermined pneumatic storage pressure within the carbonator. An automatic venting valve is placed in fluid communication with the carbonator gas base, and vents gas from the headspace when the pressure in the carbonator exceeds the preset pressure of the storage pressure regulator. The storage regulator is set at a predetermined storage pressure of 25 psig which is less than the propellant pressure, and which gives an equilibrium saturation in the carbonator of about 4½ volumes of carbonation at 0° C. One of the disadvantanges of the McMillin device is that it is not portable, and does not provide the necessary carbonation in a short time, which is desired in a home carbonating unit. For that reason, the McMillin device requires a reservoir which is continuously filled, and depends upon carbonation taking place in a nozzle which injects carbon dioxide gas and water.

Portable carbonation devices, in general, are quite old in the art. U.S. Pat. No. 565,922 (Prax) discloses a syphon bottle for carbonation having a removable lower part adapted to contain powders which when moistened, evolve the carbonating gas. Norwegian Pat. No. 52210 (Bryn), illustrates a device used for the carbonation of beverage in a bottle. In that device a cylinder containing $CO_2$ gas is placed in a housing and disposed in communication with a tube, contained inside a bottle. Gas from the $CO_2$ cannister enters the tube, and is then bubbled through the bottom of the bottle. One of the disadvantages of this device is that only a limited amount of carbonation can be achieved by this process in a reasonable time, because as the pressure in the headspace of the bottle increases, the volumetric rate of $CO_2$ through the liquid decreases.

Other references disclose how to achieve carbonation from by-products of a chemical reaction between citric acid and calcium carbonate. These include U.S. Pat. No. 3,480,403 (Hovey); U.S. Pat. No. 3,476,520 (Hovey); U.S. Pat. No. 2,600,901 (Meldau); U.S. Pat. No. 2,591,990 (Westum); U.S. Pat. No. 3,492,671 (Hovey).

U.S. Pat. No. 4,347,783 (Ogden) shows a beverage carbonator device comprising a pair of containers communicating through a spring biased valve, and having one of the containers in communication with a tube extending vertically and then horizontally in a container having liquid to be carbonated. The device illustrated is screwed on at the top of the container and provides a tight, leak proof seal with the container holding the liquid to be carbonated. Similarly, U.S. Pat. No. 4,040,342 (Austin), describes a carbonator including an absorber tank having a bottom, side walls, and a top joined together to form an airtight tank to hold a body of water. Carbon dioxide is injected into the water and the pressure of the gas above the water maintains the carbonation and provides for expulsion of the carbonated water.

Other arrangements for the carbonation of beverage include U.S. Pat. No. 4,186,215 (Buchel); U.S. Pat. No. 3,888,998 (Sampson, et al.); U.S. Pat. No. 4,025,655 (Whyte, et al.); and U.S. Pat. No. 4,110,255 (Liepa, et al.).

One of the disadvantages of the devices described in the references listed above is that they fail to provide the necessary carbonation in a reasonable time. Devices which are open to atmospheric pressure, such as the devices listed in the latter four references, fail to provide the degree of carbonation necessary for typical soft drinks, which as stated above, will vary from three to four volumes.

Other references which are pertinent to portable carbonators are U.S. Pat. No. 3,953,550 (Gilbey); and U.S. Pat. No. 4,251,473 (Gilbey).

SUMMARY OF THE INVENTION

Accordingly, in order to eliminate or ameliorate the limitations and drawbacks encountered in prior art apparatus for carbonation, the present invention contemplates a sealed container having a liquid to be carbonated, means to introduce carbon dioxide into the liquid, and a bleed line connected to the headspace of the container which maintains the pressure of the headspace at sufficiently high levels for carbonation to take place, while at the same time allowing the continuous flow of carbon dioxide through the liquid.

One preferred embodiment of the invention contemplates the source of carbon dioxide being a reaction vessel fluidly coupled to a diffuser tube inserted in the sealed container. The reaction vessel is filled with water and a chemical package, containing a mixture of chemicals that react in the presence of water to give carbon dioxide, is inserted into the reaction vessel. The chemical package of the invention provides a time delay of approximately ten seconds before the chemical reaction is allowed to begin.

BRIEF DESCRIPTION OF THE DRAWINGS

Further details are explained below with reference to the attached drawings in which:

FIG. 5 is a top view of a chemical cartridge to be used with the home carbonator;

FIG. 6 is a cross sectional view of the cartridge;

FIG. 7 is a graph, with the pressure of the headspace as the abscissa and time as ordinate, with a curve for a bleed and a curve for no bleed of the headspace;

DETAILED DESCRIPTION OF THE PREFERRED EMBODIMENT

Figure 1:
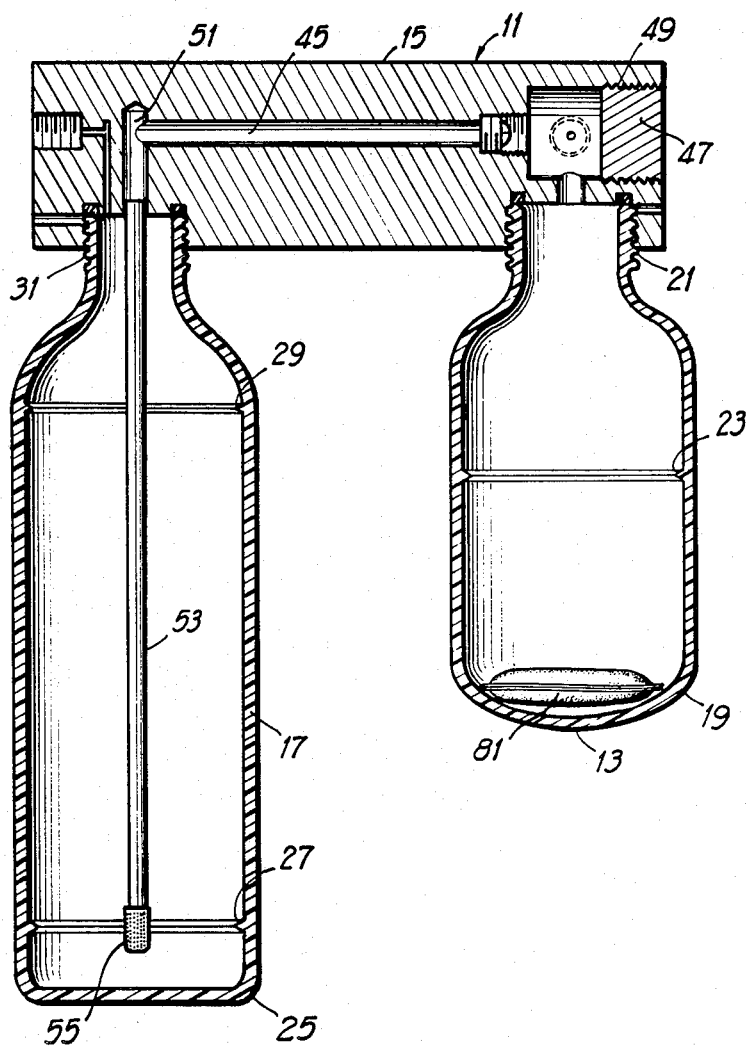
FIG. 1 is a cross-sectional view of the home carbonator of the present invention.

Illustrated in FIG. 1 is the home carbonator 11 of the present invention. The home carbonator 11 comprises a reaction vessel 13, a manifold 15, and a product container 17. The reaction vessel 13 and the product container 17 are preferably made of plastic material such as polycarbonate, PET, or the like. Plastic materials are preferred over glass because the glass could be shattered and fragments could be propelled by high pressure gasses in the containers possibly causing injury. Both the reaction vessel 13 and the product container 15 should be made of a plastic material that can withstand the pressures and temperatures generated during the carbonation process without substantial deformation. The material should also withstand temperatures used for normal washing, in the event reusable bottles are utilized.

The top of the reaction vessel 13 is provided with a threaded neck portion 21, or with an upper portion adapted to engage a conventional quick coupling device which may be incorporated in the manifold 15. The reaction vessel 13 may be provided with level indicators 23, which may be molded in the interior portion of the reaction vessel 13. The function of the level indicator 23 is to indicate the fill level of the reaction vessel 13, so that the proper amount of water for the reaction can be easily measured.

The product container 17 is provided with a stable base 25 which may be a flat cylindrical cuplike member attached to a bottle, or may be a flat portion intergrally molded with a bottle. An optional stable base 25 would be a pettaloid molded bottle which includes a number of projections (legs) which provide stable support. The product container 17 may be provided with a first fill level marking 27 to indicate the level of beverage syrup, or powder which should be added to the container to obtain an acceptable beverage product. A second fill level marking 29 may also be provided to indicate the level to which the product container 17 should be filled with cold water for the carbonation process. The product container 17 is also provided with a threaded neck portion 31, or a conventional quick coupling connection.

As illustrated in FIGS, 1, 2 and 3 the manifold 15 comprises a block of material, preferably a polymer of methylmethacrylate, or other material which can be easily machined or molded. The manifold 15 includes a first threaded opening 33 adapted to fit the threaded neck portion 21 of the reaction vessel 13. As stated previously, standard quick coupling mechanisms may be substituted for the first threaded opening 33. Disposed around the top of the first threaded opening 33 is an O-ring 35, made of an elastomeric material capable for creating an airtight seal with the top of the threaded neck portion 21 of the reaction vessel 13. As a safety feature, a venting duct 37 should be provided between the first threaded opening 33 and the exterior of the manifold 15 so that if a user attempts to remove the reaction vessel 13 while it is under pressure, the pressurized gas will vent to the atmosphere through venting duct 37.

Figure 2:
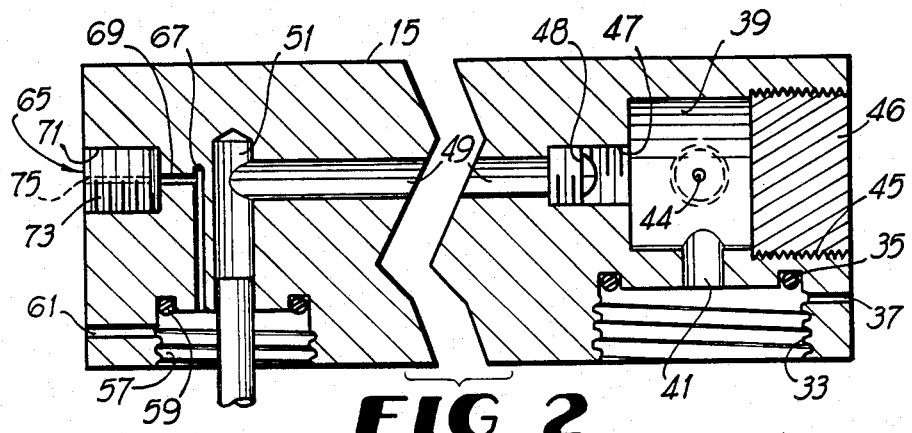
FIG. 2 is a cross-section of the manifold for the home carbonator.
Figure 3:
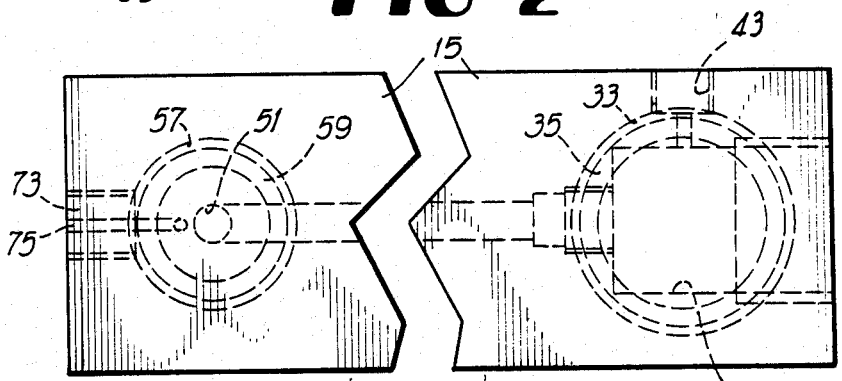
FIG. 3 is a top view of the manifold.

As shown in more detail in FIG. 2, a manifold chamber 39 is disposed adjacent to the first threaded opening 33 and is connected to the first threaded opening by means of a reaction conduit 41. The manifold chamber 39 is provided with a side opening 43 on which a pressure relief valve 44 which vents to the outside is disposed. The pressure relief valve 44 may be a spring biased valve that can be manually opened, or is automatically triggered when the pressure in the manifold chamber 39 exceeds a predetermined safe maximum pressure. The manifold chamber 39 may be formed by making a threaded opening 45 on the end of the manifold 15. A plug 46 is inserted on the threaded opening 45 to provide the hermetically sealed rear wall of the manifold chamber 39. A cavity 47 is provided adjacent to the manifold chamber 39, and a check valve 48 is disposed in the cavity 47. A longitudinal conduit 49 disposed between the check valve 48 and a vertical conduit 51. Attached to the lower end of the vertical conduit 51 is a diffuser tube 53 of predetermined length (better illustrated in FIG. 1). The length of the diffuser tube 53 depends on the height of the product container 17, the diffuser tube being long enough to reach substantially near the bottom of the product container 17 when the product container 17 is attached to the manifold 15. The diffuser tube 53, includes a porous lower portion 55 which permits the escape of carbon dioxide gas.

As shown in FIG. 2, the manifold 15 is provided with a second threaded opening 57 having an O-ring 59 made of elastomeric material. The threaded neck portion 31 of the product container 17 can be fastened to the second threaded opening 57, and forms an airtight seal with O-ring 59. A venting channel 61 is provided from the side of the second threaded opening 57 to the exterior of the manifold 15 to vent the second threaded opening 57 to the outside. The venting channel 61 vents the second threaded opening to the atmosphere as the product container 17 is disengaged.

Figure 4:
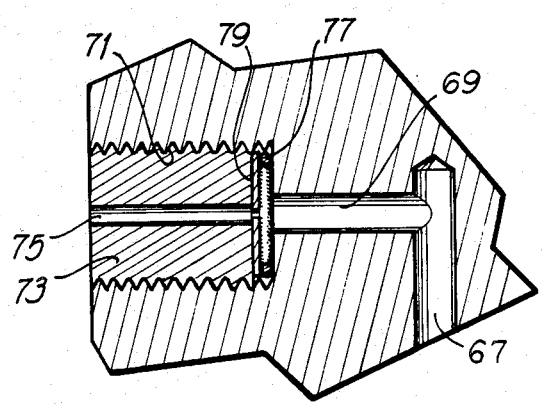
FIG. 4 is a detailed cross section view across the bleed opening in the manifold.

One of the important features of the present carbonation device is a continuous bleed line 65 which is illustrated in FIG. 2. The continuous bleed line 65 includes a vertical bleed conduit 67 coupled to a horizontal bleed conduit 69. A threaded bleed opening 71 is formed on one end of the manifold 15 so that the horizontal bleed conduit 69 communicates with the threaded bleed opening 71 (shown in detail in FIG. 4). A bleed plug 73 having a hole 75 is threaded into the threaded bleed opening 71 on the side of the manifold 15. An O-ring 77 is disposed at the end of the threaded bleed opening 71 to provide an airtight seal between the bleed plug 73 and the side walls of the threaded bleed opening 71. The O-ring 77 also serves to secure an orifice plate 79 which may comprise a thin sheet of material with a single hole placed in its center, or a thin sheet of material of known porosity (e.g., filter paper or membrane like cellulose acetate or Teflon). The function of the continuous bleed line 65 is explained below in the description of the method of the invention.

Carbonation of a beverage is accomplished by filling the product container 17 with the desired syrup and then filling the rest of the container with water preferably at a temperature within a range of (32° F.–48° F.) until the water and syrup reach the second fill level marking 29. The product container 17 is then tightly secured by its threaded neck portion 31 to the second threaded opening 37 on the manifold 15. The reaction vessel 13 is then filled to the marking 23 with water preferably at a temperature within a range of (110° F. to 200° F.).

A package 81 containing chemicals which can react in the presence of water to generate carbon dioxide is shown in FIGS. 5 and 6. An example of such chemicals are citric acid and sodium bicarbonate although any crystalline acid which reacts with a carbonate salt to give carbon dioxide can be used. The amount of chemicals used will of course vary with the volume to be carbonated. For the 2 liter example above, anywhere from 70.0 grams to 102.0 grams proved adequate for carbonation between 3.5 to 4.0 volumes of $CO_2$. The chemicals should be provided in a stochiometric ratio. The package 81 should provide a time delay of at least 10 seconds between the time when the package is dropped into the water in the reaction vessel 13, and the time when the products begin to react. One embodiment of a package 81 which provides a time delay is an impermeable parchment tube 83 sealed at the edges 85 with mucilage, or other glue that dissolves in hot water. (See FIGS. 5 and 6) Other embodiments for the package 81 may include a tube made of plastic which dissolves in water, after approximately ten seconds. The time delay is necessary to enable the user to connect the reaction vessel 13 to the first threaded opening 33 of the manifold 15.

When the package 81 is dropped in the hot water, the reaction vessel 13 is tightly coupled to the first threaded opening 33 on the manifold 15. After approximately ten seconds the water dissolves the mucilage and the chemicals begin to react. Carbon dioxide gas generated by the chemical reaction will travel through the conduit 41 into the manifold chamber 39, through the longitudinal opening 49 and into the diffuser tube 53. The carbon dioxide is then diffused into the liquid in the product container 17 through the porous lower portion 55 of the diffuser tube 53. If the pressure in the manifold chamber 39 exceeds a predetermined pressure, the pressure relief valve 44 in the side opening 43 will be opened to vent the excess pressure to the outside. The relief valve 44 prevents the pressure in the reaction vessel from reaching dangerous levels which could lead to the catastrophic failure of the materials of the reaction vessel. As the reaction proceeds, the pressure in the headspace (the space between the liquid level and the top of the neck portion of the container) of the product container 17 will rise. Unless the accumulation of carbon dioxide in the headspace is vented to the outside through the bleed line 65, the pressure in the headspace will eventually prevent any further flow of carbon dioxide through the diffuser tube 53, thereby significantly decreasing the carbonation rate. By controllably bleeding the headspace with a continuous bleed line 65, the pressure in the headspace can be maintained at a desirable level while still maintaining a continuous flow of carbon dioxide through the diffuser tube 53.

After approximately three (3) to five (5) minutes the carbonation of the product is substantially complete. At that point, the pressure in the reaction vessel and product container must be lowered to atmospheric pressure, so that the product container 17 can be removed. This can be accomplished by releasing or triggering the relief valve 44. The check valve 48 prevents the product in the product container 17 from being forced back into the reaction vessel 13. After the pressure has been released, the product container 17 is removed and the products can be consumed or, the product container 17 can be capped for future use.

An important parameter of the present invention is the size of the orifice in the orifice plate 79, or the porosity of the membrane provided across the continuous bleed line 65. It has been found that if the membrane is too porous, then the product will tend to be forced through the bleed line 65. If the membrane is not porous enough then carbonation proceeds at a slower rate.

An important parameter of the method of the present invention is the mass flow rate through the bleed line. The flow rate should be sufficient to maintain the pressure of the headspace at a value that insures flow of carbon dioxide through the diffuser tube. The orifice plate 79 limits the flow rate through the bleedline 65. The relationship can be expressed in terms of the pressure of the headspace $P_h$, the vertical distance h between the bottom of the diffuser tube 53 and the surface of the product in the product container, the specific weight w of the product in the product container 17, 25 and the pressure $P_d$ the carbon dioxide at the exit of the diffuser tube 53. Thus the desired relationship for a substantial period during the carbonation process is $P_h < P_d - hw$ When there is no bleed (see FIG. 7) the closed system reaches an equilibrium condition rapidly, thus preventing the continuous flow of carbon dioxide through the diffuser tube. It has been found that too much bleed results in the foaming of the product with resulting loss of product through the bleed line. Illustrated in FIG. 7 are the data for a membrane of 24 micron porosity. Although continuous flow of carbon dioxide was achieved, excessive foaming was experienced. An insufficient amount of bleed results in inefficient carbonation.

The characteristics of the bleedline have been determined empirically for a horizontal bleed conduit 69 having a diameter of 1/32". The volumetric flow rate across an orifice can be expressed as a function of the area of the horizontal bleed conduit, the area of the orifice, the pressure upstream from the orifice and the pressure downstream from the orifice. Since the pressure rises with time, the best way to determine the orifice size is empirically. It has been found that for the preferred embodiment, (with a horizontal bleed conduit of 1/32", and a 2 liter product container) a membrane comprising cellulose acetate or Teflon with porosity of between 0.8 to 1.2 microns was preferred. Clearly the preferred effective orifice size for different size containers, and other parameters can be established by inserting different membranes of known porosity and selecting the size that works the best for the particular embodiment selected.

Experimental Data

Set forth below are the results of a test comparing the pressure in the headspace for a product container with a vented headspace, with one for a product container with no venting, over time.

| | PSIG of Headspace | | |
|---|---|---|---|
| Time | Controlled Bleeding 0.8 micron Membrane | Controlled Bleeding 24 micron Membrane | No Bleed |
| 1 min. | 93.5 | 65 | 110 |
| 1.5 | 79 | 61 | 110 |
| 2.0 | 69 | 56 | 110 |
| 2.5 | 59 | 53 | 110 |
| 3.0 | 50 | 52 | 110 |
| 3.5 | 45 | 48 | 110 |
| 4.0 | 40 | 45 | 110 |
| 4.5 | 36.0 | 43 | 110 |
| 5.0 | 33.5 | 41 | 110 |
| 5.5 | 31 | — | 110 |
| 6.0 | 30 | — | 110 |
| 6.5 | 29 | — | 110 |
| 7.0 | 29 | — | 110 |
| Final Carbonation in volumes of $CO_2$ | 4.0 | 3.8 | less than 1 |

The results of the experimental test run referred to above are illustrated in FIG. 7 which is a plot of the carbonation pressure present in the headspace of a 2 liter product container 17 over time, for three embodiments.

FIG. 7 illustrates that when the headspace is not vented, the pressure of the carbon dioxide in the headspace rapidly reaches an equilibrium state so that the pressure in the headspace prevents further flow through the diffuser tube. Without the controlled bleeding and absent agitation of the product container, a carbonation of less than 1 volume is achieved after approximately 10 minutes. This degree of carbonation is unsatisfactory for most soft drinks.

In contrast, the data generated in the experiment in which the headspace was vented through an 0.8 micron membrane across the 1/32 inch diameter bleed line resulted in a carbonation of 4.0 volumes of carbon dioxide. Similarly, with a 24 micron membrane the final carbonation after approximately 5 minutes was 3.8 volumes of $CO_2$. As shown in FIG. 7 the embodiments having controlled bleeding exhibit a rapid pressure rise 1 to a maximum value, with a subsequent gradual decrease. It appears contradictory that better carbonation would be achieved in an embodiment with controlled bleeding since the pressure of the headspace is decreased, and the rate of carbonation varies directly with the pressure of carbon dioxide. The reason for the better carbonation is that although there is a lower carbon dioxide pressure, a greater volume of carbon dioxide is exposed to the product, because of the flow of carbon dioxide through the diffuser tube is assured thereby increasing the contact area between the product and the carbon dioxide. This would serve the same purpose as agitation to expose more $CO_2$ to the product.

Figure 8:
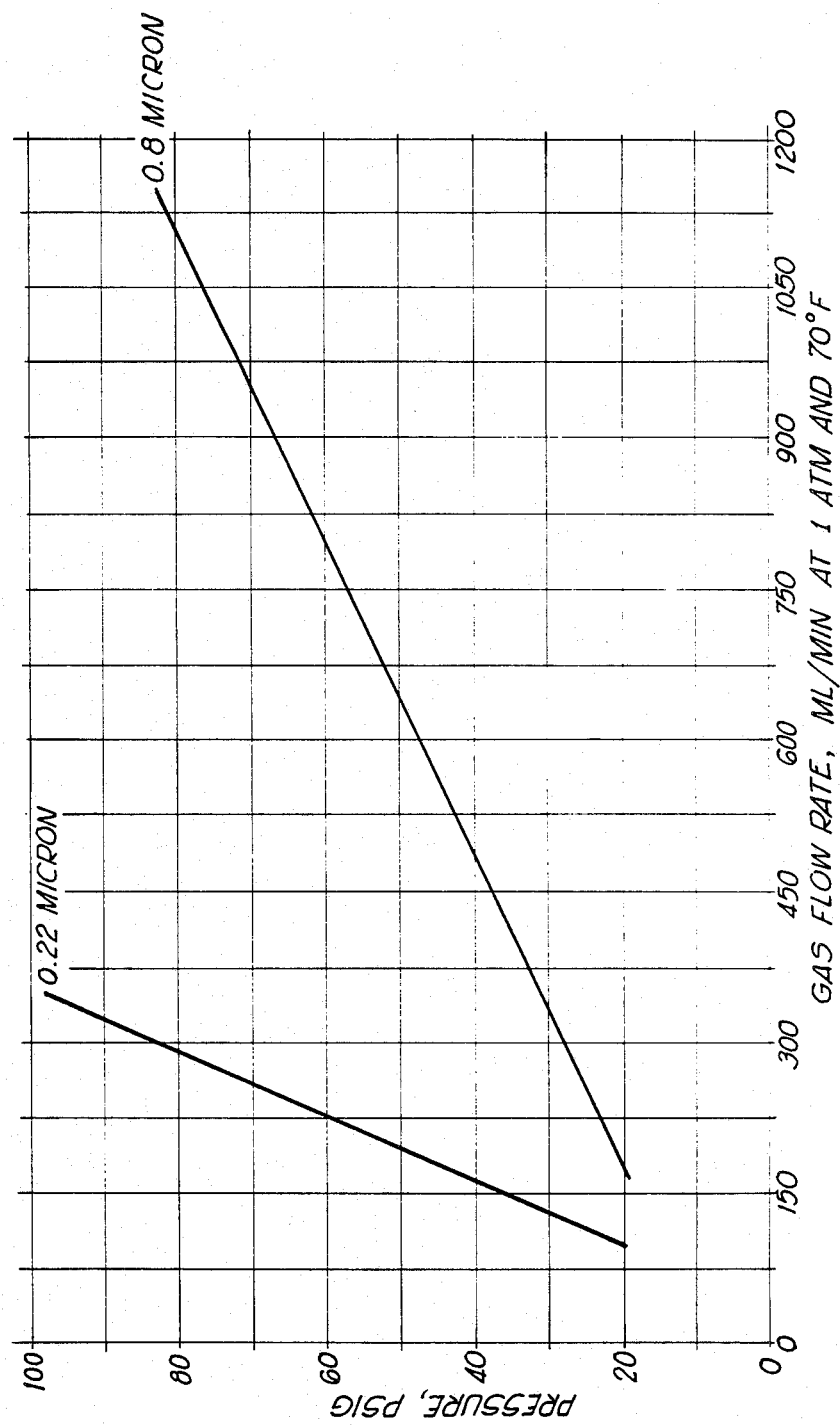
FIG. 8 is a graph with the pressure of the headspace as the abscissa and the gas flow rate as the ordinate, with a curve for a bleed line with a 0.22 micron porous membrane and one for a 0.8, micron porous membrane.

FIG. 8 illustrates the relationship between the pressure at the headspace and the volumetric flow rate through the bleed line for different porous membranes. With a 0.22 micron membrane the flow rate as a function of pressure is significantly lower than for the 0.8 micron membrane. Although the degree of carbonation achieved with the porous diaphragm of 0.22 micron was adequate in some cases, the high pressure carbon dioxide present in the headspace made it difficult to snift. Snifting is the process of relieving the pressure in the headspace before removing the product contained from the manifold. If the pressure in the headspace is too large, the sudden drop in pressure would cause the product to foam up suddenly, spilling and wasting a significant amount of the product.

The porous membrane should not have a pore size that is too large. For example when a 24 microns membrane was used, the product was carried through the bleedline. In addition to being messy, the entrainment of product by $CO_2$ bubbles flowing past the membrane would have a tendency to clog the pores.

Figure 9:
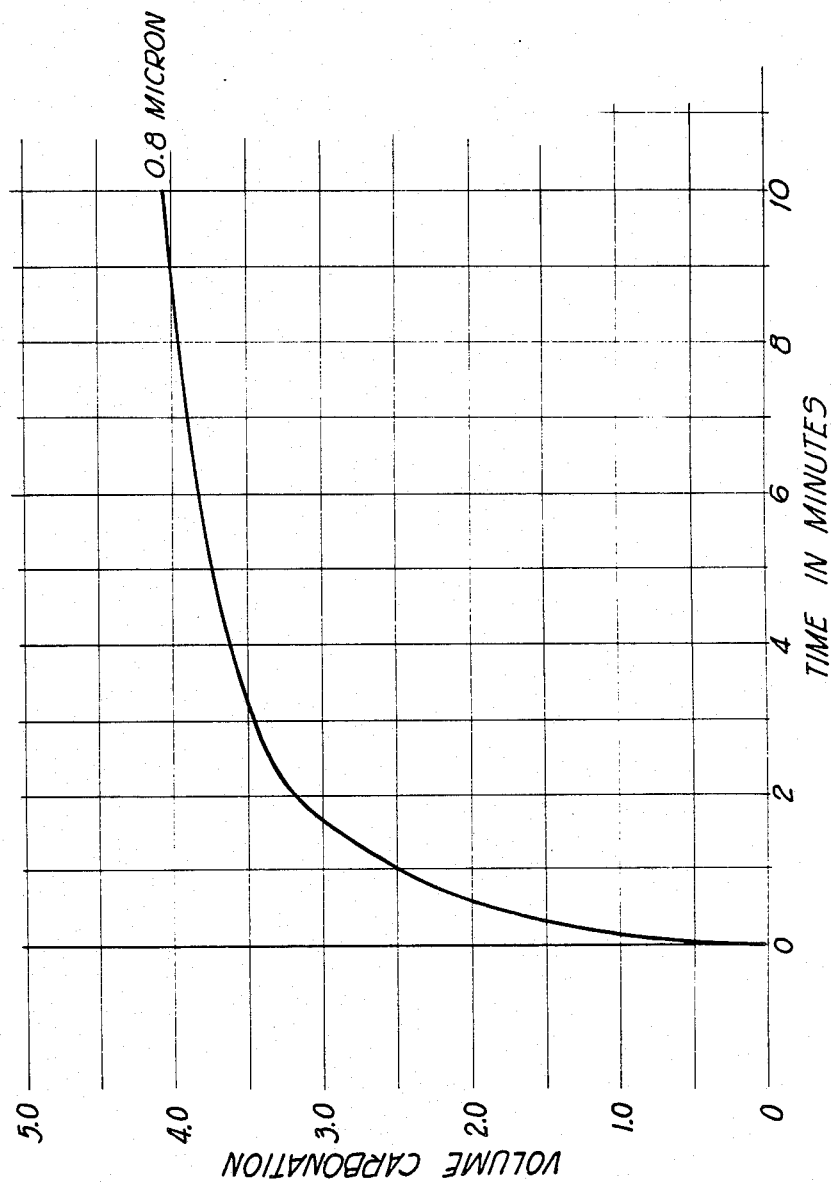
FIG. 9 is a graph with the volume of carbonation as the abscissa and the time as the ordinate, with a curve for a bleed line with a 0.8 micron porous orifice.

FIG. 9 shows the degree of carbonation achieved over a period of time, for a 0.8 micron membrane across the 1/32" diameter bleedline. FIG. 9 illustrates that with controlled bleeding an effective amount of carbonation can be achieved in a relatively short amount of time.

While certain specific embodiments of an improved home carbonation apparatus and method have been disclosed in the foregoing description, it will be understood that various modifications within the spirit of the invention may occur to those skilled in the art. Therefore, it is intended that no limitations be placed on the invention except as defined in the appended claims.

What is claimed is:

1. An apparatus for carbonating a predetermined measure of liquid comprising:
    a source of carbon dioxide under pressure;
    a container of predetermined volume larger than the volume of the measure of liquid thereby defining a headspace when the measure of liquid is placed in the container;
    means for fluidly coupling said source with the bottom of said container to enable the flow of carbon dioxide through the liquid; and
    a bleed line coupled to the headspace of said volume for continuously bleeding the gases in the headspace to the atmosphere during the flow of carbon dioxide through the liquid without loss of the liquid through the bleed line to the atmosphere while maintaining a pressure in the headspace within a desired range; whereby a continuous flow of carbon dioxide through the liquid can be assured and whereby an effective amount of carbonation can be achieved in a relatively short amount of time.

2. The apparatus of claim 1 wherein said source of high pressure carbon dioxide comprises:
    a reaction receptacle of predetermined volume; and
    means for producing carbon dioxide from a chemical reaction between two reagents.

3. The apparatus of claim 2 wherein said source means for producing comprises:
    a predetermined volume of water;
    a mixture of crystalline acid and salt having a carbonate group; and
    means for enclosing said mixture to prevent the permeation of water into the chemical mixture for a limited period of time.

4. The apparatus of claim 3 wherein said crystalline acid is citric acid and said salt is sodium bicarbonate.

5. The apparatus of claim 3 wherein said means for enclosing comprises:
    an impermeable sheet of material secured at the edges with a water soluble adhesive.

6. The apparatus of claim 3 wherein said predetermined period of time is greater than or equal to ten seconds.

7. The apparatus of claim 1 wherein said means for fluidly coupling comprises:
    a manifold having a conduit between the source and an outlet aperture adjacent said container;
    a tube coupled to said outlet aperture; and
    a diffuser membrane coupled to the bottom of the tube.

8. The apparatus of claim 7 further comprising a check valve disposed in said conduit between the source and the outlet aperture.

9. The apparatus of claim 7 further comprising a relief valve disposed in communication with said conduit between the source and the outlet aperture.

10. The apparatus of claim 1 wherein said means for continuous bleeding comprises:
    a duct coupled to said headspace and
    means for limiting the flow rate through the duct.

11. The apparatus of claim 10 wherein said means for limiting comprises:
    a plate with an orifice of predetermined area disposed across said duct.

12. The apparatus of claim 10 wherein said means for limiting comprises:
    a porous membrane disposed across said duct.

13. The apparatus of claim 10 wherein said duct has a diameter of approximately 1/32 inch, and said means for limiting comprises a porous membrane with a porosity of approximately between 0.22 to 24 microns.

14. In a carbonating device including a source of carbon dioxide, a container for liquid to be carbonated, wherein the container and liquid define a headspace, and a conduit member for introducing the carbon dioxide gas near the bottom of the container, the improvement comprising:
    bleed line means fluidly coupled to the headspace, for continuously venting the headspace to the atmosphere while carbon dioxide is flowing through the liquid to be carbonated without loss of the liquid through the bleed line to the atmosphere to maintain a predetermined pressure in the headspace, whereby the flow of carbon dioxide through said member is maintained by continuous pressure differential between the conduit member and the headspace and whereby an effective amount of carbonation can be achieved in a relatively short amount of time.

15. The carbonating device of claim 14 wherein said bleed line means comprises:
    a duct disposed between the headspace and the atmosphere, and means disposed in said duct for slowing the flow rate through said duct.

16. The carbonating device of claim 15 wherein said means for slowing comprises:

an orifice plate is disposed across said duct.

17. The carbonating device of claim 15 wherein said means for slowing comprises:

a porous membrane disposed across said duct.

18. The carbonating device of claim 17 wherein the effective amount of carbonation is between 3.5 and 4.0 volumes of carbon dioxide for most soft drinks; and the relatively short amount of time is less than seven minutes.

19. The carbonating device of claim 17 wherein said duct has a diameter of about 1/32 of an inch, and said porous membrane is a porous membrane having a porosity of between 0.22 to 24 microns.

20. The carbonating device of claim 19 wherein the porosity of said porous membrane is between 0.8 to 1.2 microns.

* * * * *